March 2, 1943.   H. J. FERRIS   2,312,808
GRAPPLE FORK
Filed June 3, 1942   5 Sheets-Sheet 1

Inventor:
Howard J. Ferris,
By Chritton, Wiles, Davies & Kirschl,
Attys.

March 2, 1943.  H. J. FERRIS  2,312,808
GRAPPLE FORK
Filed June 3, 1942   5 Sheets-Sheet 3

Patented Mar. 2, 1943

2,312,808

UNITED STATES PATENT OFFICE 2,312,808

GRAPPLE FORK

Howard J. Ferris, Harvard, Ill., assignor to Starline, Inc., Harvard, Ill., a corporation of Illinois Application June 3 1942, Serial No. 445,555

27 Claims. (Cl. 294—109)

My invention relates to grapple forks for use more particularly in shifting hay from one location to another, as for example from a wagon into a loft, or vice versa, and comprising separate tine sections located at opposite sides of the fork and adapted to be manipulated toward each other into carrying engagement with the hay to pick up a load thereof and away from each other to drop the load.

The invention relates more especially to that type of grapple forks in which the tine sections are connected toward their outer ends with a head and inwardly of their points of connection with the head, with a member, as for example, and more particularly, a swivel, having releasable connection with the head under the control of the operator.

In this type of grapple fork the stress of the loaded fork in load-carrying position is taken through the swivel and its connections with the tine sections, the swivel in this position being releasably connected with the head; and upon releasing the swivel from the head stress of the load is transferred from the swivel to the connections between the head and the tine sections, the tine sections in this operation automatically swinging outwardly to drop the load.

The member to which the inner ends of the tine sections are connected is customarily a swivel inasmuch as the inner ends of the tine sections in the suspended non-loaded condition, mutually overlap, whereas when the tine sections are spaced apart to apply them to the hay to be lifted, their inner ends move out of overlapped position to a position in which they are spaced apart; and by employing a swivel the tine sections may be swung into and out of the overlapped position as stated, without cramping or other interference.

Furthermore, it is customary to employ a trip element commonly formed in part of a rope or the like, controlled by the operator for effecting by pull thereon the release of the swivel from the head to drop the load; and in some constructions provision has been made for returning the swivel to interlocked position on the supporting member by means of this same trip element, in order that the grapple device may be readily manipulated, in suspended condition (after the load has been dropped), into a position in which the tine sections are closed, namely, in which the extremities of the tine sections instead of projecting downwardly, extend in a general horizontal direction and thereby reduce the menace of the grapple fork injuring anyone against whom it may be lowered.

In such constructions of the prior art wherein the trip element is directly connected with the swivel and is subjected to the weight of the loaded fork upon release of the swivel, the force necessary to release the swivel is so great that the loaded fork in dropping produces violent jerking of the trip element while the operator is holding it, the jerking being so severe as to oftentimes lift the operator off his feet, and thus constitute a great menace to the operator.

My object generally stated is to provide improvements in grapple forks of the general type above referred to, to the end of rendering them better adapted for performing their intended purpose; and especially to provide a grapple fork of the character employing a trip element to be pulled for performing the tripping function as well as the re-setting function above referred to, whereby the stress required to be exerted by the operator on the trip element in the manipulation thereof to drop the loaded fork, will be greatly reduced thereby minimizing jerking of the operator. Other objects will be manifest from the following description.

Referring to the accompanying drawings.

Referring to the construction shown in Figs. 1-5, inclusive, the grapple-fork illustrated and in connection with which I have chosen to illustrate my invention, comprises two tine sections 7 each shown as formed of two curved spaced apart tines 8 provided on the outer ends of bar portions 9 extending at an angle thereto, the bar portions 9 being connected together at their inner ends as represented at 10 and adjacent the tines 8 by a bar represented at 11.

The construction shown also comprises a head 12 to the opposite ends of which chains 13, connected with the tine sections 7 between their ends as represented at 14, are secured.

The head 12 is shown as formed of a pair of flatwise opposed spaced apart plates 15 connected together at their lower corners by spacer-bolts 16 to which the chains 13 are connected and at their top portions by a spacer bolt 17. Clevises 18 pivoted on the bolts 16 are attached to the chains 13 and a clevis 19 carried by the spacer bolt 17 serves as a means of supporting the grapple fork from any suitable hoisting and conveying mechanism such as that commonly provided with forks of this kind and supported in accordance with common hay carrier apparatus to depend from a carrier (not shown) movable along a track (not shown).

Chains 20 connected at their outer ends with the inner ends of the tine sections 7 as indicated at 21, are connected at their inner ends with lateral extensions 22 provided on the lower end of a swivel 23, the upper end of which terminates in an enlargement 24 presenting an upwardly extending frusto conical portion 25 and a downwardly facing annular shoulder 26.

Figures 1, 2:
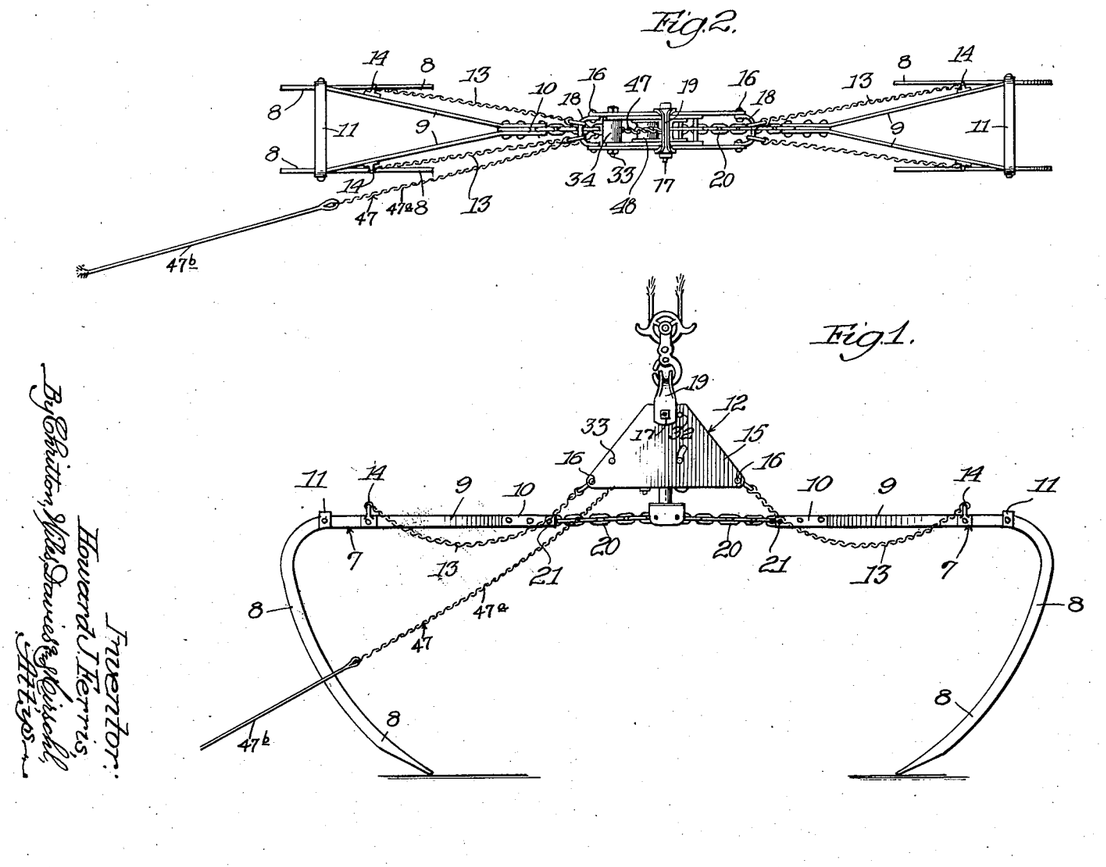
Figure 1 is a view in side elevation of a grapple fork constructed in accordance with my invention, the structure being shown in a position it may assume upon starting to lift a load.
Figure 2 is a plan view of the structure shown in Fig. 1 with the parts of the fork in the same positions illustrated therein.
Figure 3:
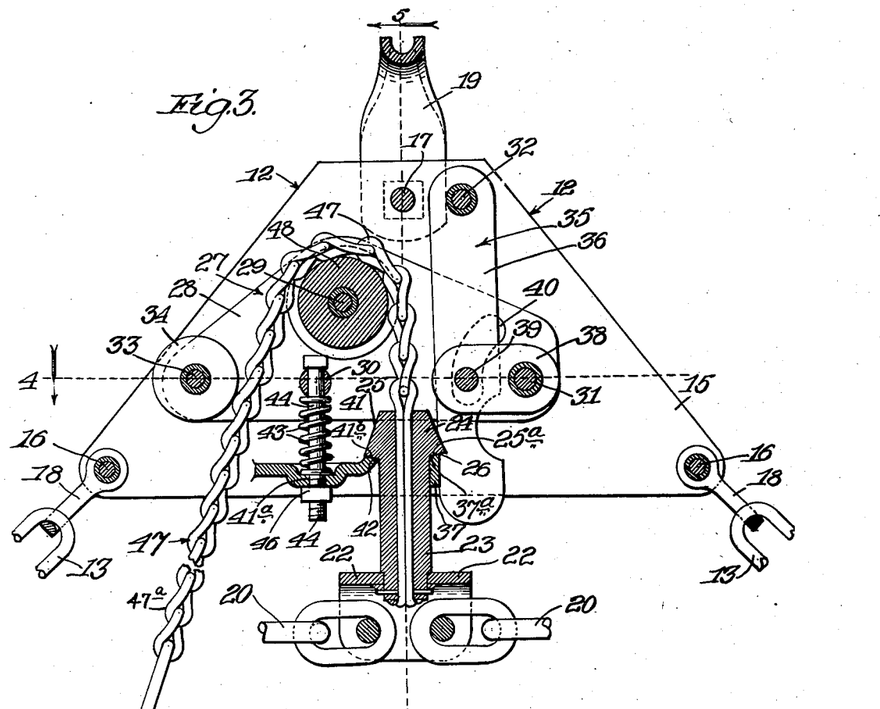
Figure 3 is an enlarged, detailed view, in sectional elevation of the central portion of the structure shown in Figs. 1 and 2, with the several parts shown in the same positions as in Figs. 1 and 2.
Figure 4:
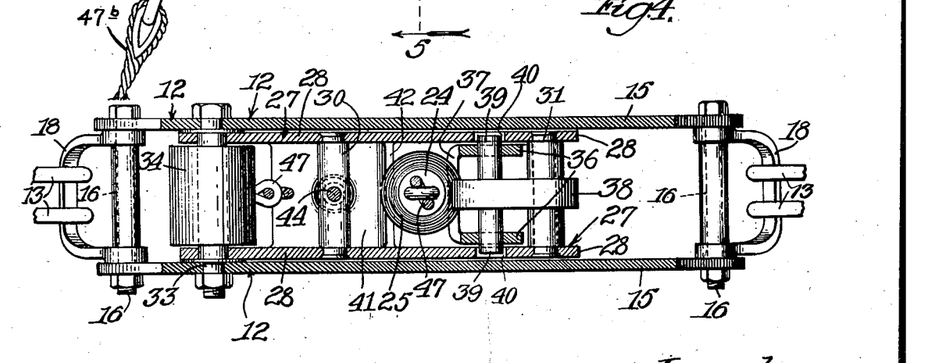
Figure 4 is a plan sectional view of the structure of Fig. 3, the section being taken at the line 4 on Fig. 3 and viewed in the direction of the arrow.
Figures 5, 6:
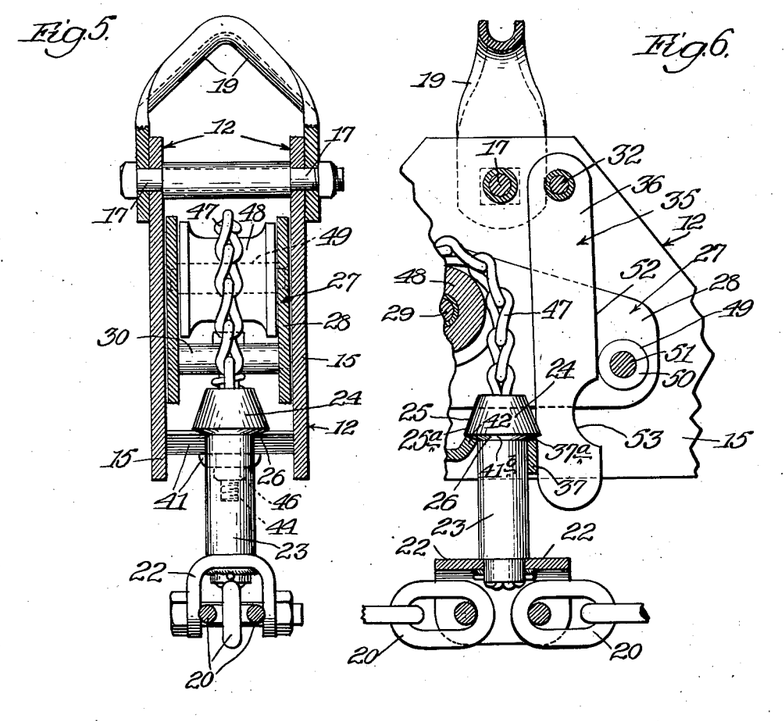
Figure 5 is a vertical sectional view of the structure of Fig. 3, the section being taken at the line 5 on Fig. 3 and viewed in the direction of the arrow.
Figure 6 is a fragmentary view like that of Fig. 3 showing a modification of the latching means thereof and constituting another embodiment of my invention.

Within the head 12 is a frame 27 formed of plates 28 secured together in spaced relation by rivets 29, 30 and 31 and pivotally supported at one end on a bolt 33 carried by the head 12 and on which a roller 34 within the frame, is journaled.

Within the frame 27 is a link 35 for cooperation with the swivel 23 comprising a pair of bars 36 pivoted at their upper ends on a pin 32 on the head 12 and connected together adjacent their lower ends by a cross bar 37 forming a jaw.

Located between the bars 36 and pivoted at one end on the rivet 31 is a link 38 having pivotal connection with the bars 36 by a pivot pin 39 shown as extending at its ends into arcuate slots 40 in the plates 28.

At the side of the swivel 23 opposite that engaged by the cross-bar 37 of the link 35 is a cross bar 41 rigidly connected at its ends with the plates 15 and forming a stationary seat 42 or jaw for engagement by the shoulder 26 of the swivel 23.

Positioned between, and bearing at its ends against, the cross bar 41 and the rivet 30 is a coil spring 43 which yieldingly supports the frame 27 in the position shown in the drawings, the spring 43 being held against lateral displacement by a post 44 within the spring 43 and slidable at its lower end in an opening 41a in the cross bar 41; the angular position of the frame 27 being adjusted by means of a nut 46 screwed on the lower end of the post 44 and bearing against the underside of the cross-bar 41.

The construction also comprises a trip element 47 shown as formed of a chain section 47a and a rope section 47b connected together which is located between the plates 28, is connected at one end with the swivel 23 and thence extends over the pulley 48 journaled on the rivet 29 and downwardly between the pulley 48 and the roller 34 to a point accessible for actuation by the operator in the elevated position of the fork.

The operation of the fork is as follows: Assuming the fork to be in lowered position with the swivel 23 interlocked at its shoulder 26, with the jaws 37 and 42, the operator to load the fork, manipulates the independently movable tine sections 7 into the desired position in the mass of hay for picking up the desired load, the tines 8, in substantially vertical position being forced downwardly by the operator into the hay.

Upon positioning the tine sections 7 as stated, the hoisting mechanism is operated to grapple and elevate a load of hay. Inasmuch as the swivel 23 is interlocked with the head 12 the lifting force exerted by the hoisting mechanism is exerted on the tine sections 7 at their connections with the chains 20, whereby the tine sections, in the initial movement of the hoisting mechanism, swing inwardly at their tines 8, toward the mass of hay between the tines causing a load of hay to become cradled in the fork, in carrying position; and in the continued operation of the hoisting mechanism the fork with its load is lifted.

Upon reaching the point at which the load is to be dropped, the operator pulls on the outer end of the trip element 47, with the result of rocking the frame 27 downwardly on its pivot 33 against the resistance of the spring 43, thus lowering the pivot 31 of the link 38. As the link 38 is pivoted at 39 to the depending link 35 which is supported on the head 12 and thus cannot lower, the link 38 rotates on its pivots 31 and 39 in which operation the jaw 37 releases from the swivel 23 and permits the latter to drop under the weight of the load, which exerts a spreading action on the tines 8 of the respective tine sections 7 and causes the load to drop from the fork, the parts of the fork in this operation assuming positions in which the inner ends of the tine sections 7 move to mutually overlapped position, the support for the tine sections 7 shifting from the chains 20 to the chains 13 in the dropping of the swivel 23.

Following the dumping of the load and while the fork is in elevated position, the operator pulls on the trip element 47 to raise the swivel 23 and cause it to become interlocked with the jaws 42 and 37 in which operation the tine sections 8 are caused to swing into closed position, viz., a position in which the tines extend into the desired substantially horizontal position to reduce danger to the workmen standing beneath the fork, in the lowering of the fork.

The fork, to pick up another load, is lowered, with its tines in the position last referred to, viz., in substantially horizontal position, to the hay to be elevated and the operation first above described repeated, in which operation the tine sections 7 move out of mutually overlapped position, during which operation the swivel 23 turns in the head 12.

The parts of the structure are preferably so constructed and arranged that in the locked position of the swivel 23 the pivots 33, 39 and 31 lie substantially in a common plane substantially at a right angle to the longitudinal axis of the swivel 23 and therefore substantially at a right angle to the line of movement of the swivel 23 as shown, which condition tends to hold the swivel-locking means against accidental release. By this arrangement the locking means may be actuated by the operator by the exertion of a comparatively light pull on the trip element even when the fork is heavily loaded, the compressor spacer spring being used to ensure the automatic interlocking of the swivel 23 with the jaws 42 and 37 in the raising of the swivel in the unloaded condition of the fork. It will be understood that the frame 27 in this operation swings down on its pivot 33 when the tapered upper end 25 of the swivel pushes upwardly on the link 35 and cross bar 41 and the trip rope 47 pulls downwardly on the roller 48, lowering the frame 27 whereupon link 35 is permitted to swing outwardly to permit the swivel in its continued upward movement to pass upwardly between the jaws 42 and 37 whereupon the spring 43 operates to swing the frame 27 upwardly, causing the link 35 to return to swivel-locking position.

Inasmuch as grapple forks in use are subjected to considerable shaking or vibration which would have a tendency to accidentally break the toggle thus provided and release the jaw 37 from the swivel 23 when the frame 27 is adjusted so that the pivots 33, 39 and 31 lie in the same plane and are thus responsive to a very light pull on the trip element 47, should the pivot 31 move downwardly below the plane of the pivots 33 and 39, it is preferred to adjust the pivot 31, by adjusting the nut 46, a sufficiently slight distance above said plane, depending on the weight of the trip element, for preventing such accidental release without substantially increasing the force required to be exerted by the operator to release the swivel.

In practice it is preferred that the surfaces, of the swivel 23 and jaws 37 and 41 which mutually engage in the locked position of the swivel, be beveled relative to the longitudinal axis of the swivel as represented at 37a and 41b, respectively, preferably at an angle of about 15° in the case of the surface 25a and about 75° in the case of the surfaces 37a and 41b, whereby the weight of the swivel 23, when loaded, will operate to automatically swing the link 35 to releasing position when the operator, by actuating the trip element 47, rocks the rock member 27 downwardly.

However, the adaptability of the construction for exerting positive force on the link 35, swinging it toward released position by reason of its connection at 39 with the link 38, when the trip element is pulled, may be availed of as a factor in designing the construction, whereby, if desired, the mutually engaging surfaces of the jaws 37 and 41 and the swivel 23 need not be at such an angle to the longitudinal axis of the swivel that the mere weight of the loaded swivel would force the link 35 to released position when the trip element is pulled but that this pulling action, by the link 25 be relied on at least in part to effect release. A further factor which may be considered in connection with the designing of the construction is the tendency of the swivel to release due to the shaking and vibrating action of the fork in operation which would have a tendency to disengage the swivel from the jaws, when the trip element is pulled.

The modified construction shown in Fig. 6 is the same as that shown in Figs. 1–5 except that instead of providing the link 38 for cooperation with the link 35, the frame 27 is provided with a stop 49, shown as a roller 50 journaled on a pin 51 on the frame 27 and adapted to roll on the outer edge 52 of the link 35 and the link 35 is recessed at 53 to receive the roller 50 in the depressed position of the swinging frame 27. In the closed position of the jaws 42 and 37 the plane in which the roller 51 and the pivot 33 for the frame 27 extends, is at substantially a right angle to the longitudinal axis of the swivel 23 and therefore at substantially a right angle to the line of movement of the swivel 23 and the roller 50 extends above the recess 53 in which position of the parts there is no tendency for the roller 50 to move.

When the trip element 47 is pulled, in the loaded condition of the swivel 23, the frame 27 is swung down against the resistance of the spring 43 to a position in which the stop roller 50 registers with the recess 53 which it enters and the link 35 swings to the right releasing the swivel 23 from the jaws 42 and 37.

To avoid, in the vibrating or shaking action to which the fork is subjected in use, accidental registration of the roller 50 with the recess 53 which would result in the premature dropping of the load, the parts are so constructed and arranged that the plane formed by pivots 33 and 51 is adjusted by the nut 46 substantially above the upper edge of the recess 53.

In the case of this construction as in the case of that shown in Fig. 3, the fact that the fork is subjected in use to the shaking or vibration which tends to disengage the swivel from the jaws 37 and 42, may be availed of as a factor in the designing of the angularity of the mutually engaging interlocking surfaces of the jaws and swivel, though it is preferred that these surfaces be inclined at about the angles to the longitudinal axis of the swivel as hereinbefore set forth, such inclination, by itself, effecting automatic release of the loaded swivel when the pin is moved by the rocking of the frame 27 to releasing position. Furthermore, the adjustable feature of the spring of this construction permits compensating for different weights of trip elements.

The modifications shown in Figs. 7–12, inclusive, illustrate embodiments of my invention wherein instead of providing one stationary jaw and one movable jaw for interlocking with the swivel member, both jaws are provided as movable members.

Figures 7, 8:
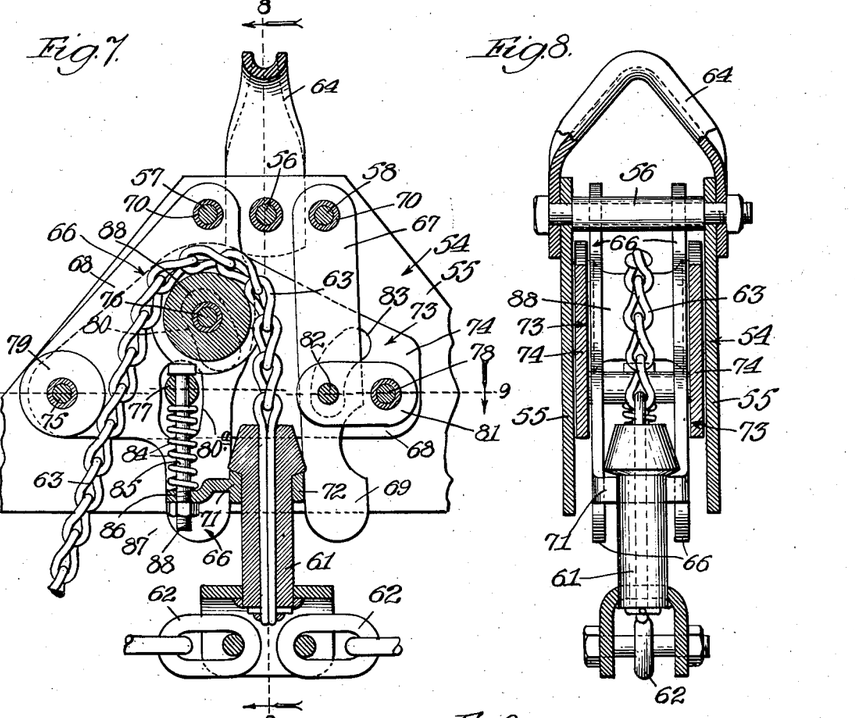
Figure 7 is a view like Fig. 1 of another modification of my invention.
Figure 8 is a plan sectional view of the structure shown in Fig. 7 the section being taken at the irregular line 8—8 on Fig. 7 and viewed in the direction of the arrows.
Figure 9:
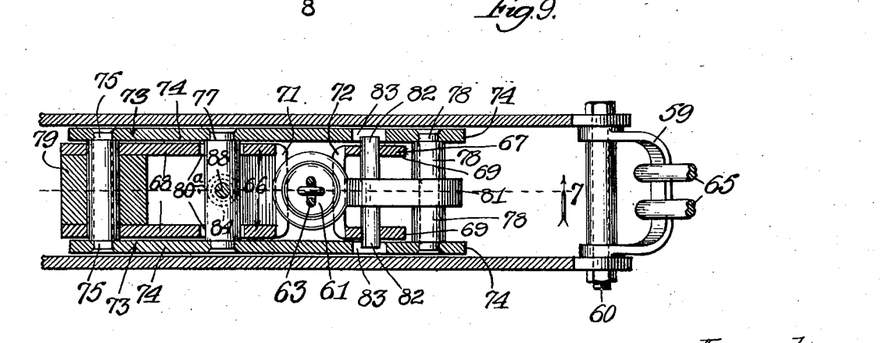
Figure 9 is a vertical sectional view of the structure of Fig. 7 the section being taken at the line 9—9 on Fig. 7 and viewed in the direction of the arrows.

Referring to the construction shown in Figs. 7–9, it comprises a head 54 corresponding with the head 12 of Figs. 1–5, and formed of two plates 55 spaced apart and held together at their upper portions by a spacer bolt 56 and bolts 57 and 58 at opposite sides of the bolt 56 and at their opposite ends by clevises and bolts those at one end being shown at 59 and 60; a swivel member 61 corresponding with the swivel 23; chains 62 corresponding with the chains 29; a trip element 63, corresponding with the trip element 47 and connected with the swivel 61; a clevis 64 corresponding with the clevis 19 and carried by the spacer bolt 56; and chains secured to the clevises 59 and corresponding with the chains 13, one of these chains being shown at 65; the clevis 64 being associated with hoisting means as in the construction of Figs. 1-5 and the chains 62 and 65 being associated with tine sections as in the case of the construction shown in Figs. 1-5.

Within the head 54 is a pair of links 66 and 67 formed of bars 68 and 69, respectively, spaced apart. The links 66 and 67 are pivotally supported at their upper ends on the bolts 57 and 58, respectively, with spacer sleeves 70 thereon between the bars of the links, the bars of the links being connected together adjacent their lower ends by cross-bars 71 and 72, respectively, forming jaws.

Located in the head 54 and outside of the links 66 and 67 is a frame 73 formed of plates 74 secured together in spaced relation by rivets 75, 76, 77 and 78, the frame 73 being pivotally supported on the link 66 by the rivet 75 which carries a roller 79 located within the link 66. The rivets 76 and 77 are located at the link 66 and to permit the frame 73 to rock on the pivot 57 the bars of the link 66 have arcuate slots 80 and 80a through which the rivets 76 and 77, respectively, extend.

Located between the bars 69 of link 67 and pivoted at one end on the rivet 78 is a link 81 having pivotal connection with the bars 69 by a pivot pin 82 shown as extending at its ends into arcuate slots 83 in the plates 55 of head 54.

Positioned between, and bearing at its ends against, the cross-bar 71 and the rivet 77 is a coil spring 84 which yieldingly supports the frame 73 in the position shown in the drawings, the spring 84 being held against lateral displacement by a post 85 within the spring 84 and slidable at its lower end in an opening 86 in the cross-bar 71; the angular position of the frame 73 being adjustable by means of a nut 87 screwed on the lower end of the post 85 and bearing against the underside of the cross-bar 71.

The trip element 63 which is located between the bars 68 of the link 66, extends from the swivel 61 over a pulley 88 journaled on the rivet 76 and thence to a position accessible for actuation by the operator in the elevated position of the fork.

The operation of the fork to pick up a load of hay, assuming the swivel 61 to be interlocked with the jaws 71 and 72, is the same as that described above as to Figs. 1-5. The dumping of the load is effected by the operator pulling on the trip element 63 which rocks the frame 73 downwardly on its pivot 75 against the resistance of the spring 84 in which operation the link 81 rotates on its pivots 78 and 82 causing the links 67 and 68 to swing apart thereby releasing the swivel 61 from the jaws 71 and 72 which permits the load to drop from the fork.

The parts of the structure are preferably so constructed and arranged that in the locked position of the swivel 61 the pivots 75, 78 and 82, lie substantially in a common plane substantially at a right angle to the longitudinal axis of the swivel 61 and therefore substantially at a right angle to the line of movement of the swivel as shown, which condition tends to hold the swivel-locking means against accidental release with the advantage as above pointed out in connection with the construction shown in Figs. 1-5, though it is preferred that the pivot 78 be adjusted, by manipulating the nut 87, a slight distance above the plane in which the pivots 75 and 82 lie, as and for the purpose as above explained of the pivot 31.

The compressor spacer spring 84 serves the same purpose as the spring 43 of Figs. 1-5 in the raising of the swivel 61 in the unloaded condition of the fork, in which operation the upward wedging of the swivel 61 against the jaws 71 and 72, in pulling on the trip element 63 and producing downward swinging of the frame 73, causes the swivel to pass at its enlargement upwardly beyond the jaws 71 and 72, whereupon the spring 84 swings the frame 73 upwardly causing the link 81 to return to swivel-locking position.

The surfaces of the swivel 61 and jaws 71 and 72 which mutually engage in the locked position of the swivel are preferably beveled as explained above in connection with the construction shown in Figs. 1-5 for the purposes stated. However, in this connection, the adaptability of the construction to exert positive force on the link 81 when the trip element 63 is pulled as also shaking and vibrating action, may be taken into consideration as factors in designing the structure as explained above in connection with the structure of Figs. 1-5.

Figures 10, 12:
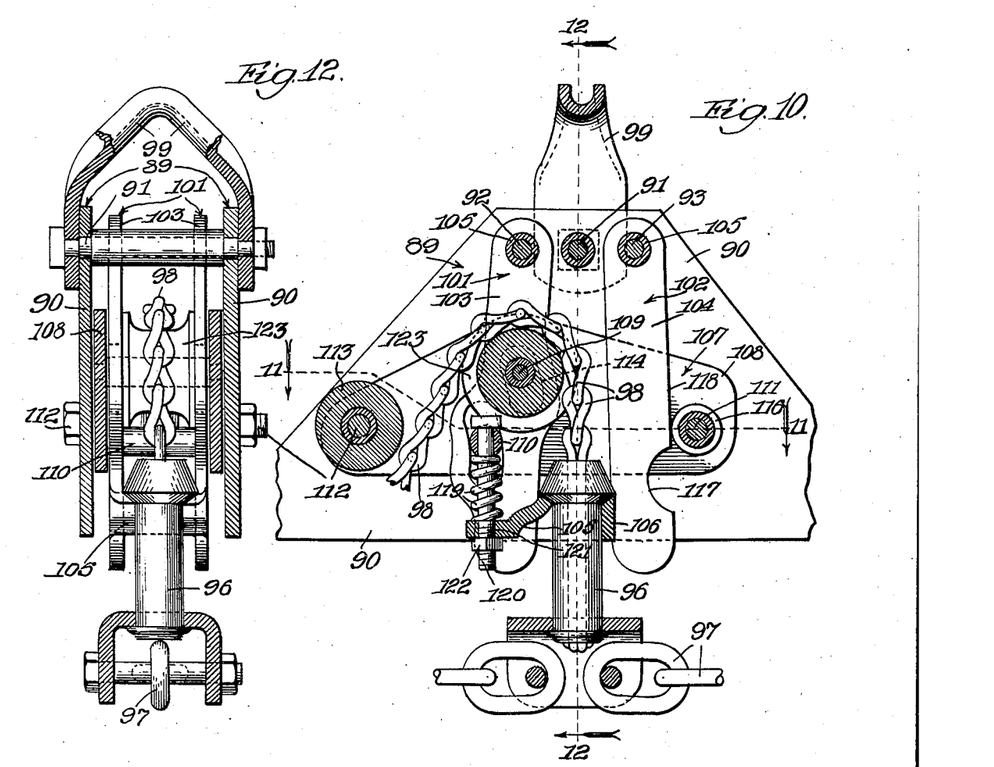
Figure 10 is a view like Fig. 1 of another modification of my invention.
Figure 12, a vertical sectional view of the structure shown in Fig. 10, the section being taken at the line 12—12 on Fig. 10 and viewed in the direction of the arrows.
Figure 11:
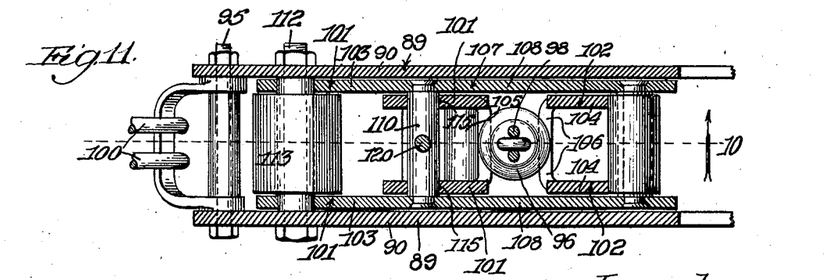
Figure 11 is a plan sectional view of the structure shown in Fig. 10, the section being taken at the irregular line 11—11 on Fig. 10 and viewed in the direction of the arrows.

Referring to the construction shown in Figs. 10-12, its comprises a head 89 corresponding with the head 12 of Figs. 1 to 5, and formed of two plates 90 spaced apart and held together at their upper portions by a spacer bolt 91 and bolts 92 and 93 at opposite sides of the bolt 91 and at their opposite ends by clevises and bolts those at one end being shown at 94 and 95; a swivel member 96 corresponding with the swivel 23; chains 97 corresponding with the chains 20; a trip element 98, corresponding with the trip element 47 and connected with the swivel 96; a clevis 99 corresponding with the clevis 19 and carried by the spacer bolt 91; and chains secured to the clevises 94 and corresponding with the chains 13, one of these chains being shown at 100; the clevis 99 being associated with hoisting means as in the construction of Figs. 1-5 and the chains 97 and 100 being associated with tine sections as in the case of the construction shown in Figs. 1-5.

Within the head 89 is a pair of links 101 and 102 formed of bars 103 and 104, respectively, spaced apart. The links 101 and 102 are pivotally supported at their upper ends on the bolts 92 and 93, respectively, with spacer sleeves 105 thereon between the bars of the links, the bars of the links being connected together adjacent their lower ends by cross-bars 105 and 106, respectively, forming jaws.

Located in the head 89 and outside of the links 101 and 102 is a frame 107 formed of plates 108 secured together in spaced relation by rivets 109, 110 and 111, the frame 107 being pivotally supported at one end on a bolt 112 carried by the head 89 and on which a roller 113, within the frame 107, is journaled. The rivets 109 and 110 are located at the link 101 and extend through arcuate slots 114 and 115, respectively, in the bars 103 of this link. The slot 115 is shown as struck from a center below the bolt 112 to form a cam against which the rivet 110 moves in the swinging of the frame 107, producing, when the frame 107 is swung downwardly, a camming action aganist the link 101 which swings this link to the left in Fig. 10 from the position therein shown, and when the frame 107 is swung upwardly from depressed position, producing a camming action against this link which swings this link back to the position shown in this figure.

The rivet 111 of frame 107 carries a roller 116 forming a stop for cooperation with the link 102 which is recessed at 117, the roller 116 being adapted to roll on the outer edge 118 of the link 102. The recess 117 is provided to receive the roller 116 in the depressed position of the swinging frame 107.

Positioned between, and bearing at its ends against, the cross bar 105 and the rivet 110 is a coil spring 119 which yieldingly supports the frame 107 in the position shown in the drawing, the spring 119 being held against lateral displacement by a post 120 within the spring 119 and slidable at its lower end in an opening 121 in the cross-bar 105; the angular position of the frame 107 being adjustable by means of a nut 122 screwed on the lower end of the post 120 and bearing against the underside of the cross-bar 105.

The trip element 98 which is located between the bars 103 of the link 101, extends from the swivel 96 over a pulley 123 journaled on the rivet 109 and thence to a position accessible for actuation by the operator in the elevated position of the fork.

In the closed position of the jaws 105 and 106 the plane in which the roller 116 and the pivot 112 for the frame 107 extends, is at substantially a right angle to the longitudinal axis of the swivel 96 and therefore at substantially a right angle to the line of movement of the swivel 96 and the roller 116 extends above the recess 117 in which position of the parts there is no tendency for the roller 116 to move.

When the trip element 98 is pulled, in the loaded condition of the swivel 96, the frame 107 is swung down against the resistance of the spring 119 to a position in which the stop roller 116 registers with the recess 117 which it enters in which operation the link 102, because of the force exerted against it by the loaded swivel 96, swings to the right in Fig. 10 and the link 101, by reason of the camming action exerted against it by the rivet 110, swings to the left in this figure thus releasing the swivel 96 from the jaws 105 and 106.

To avoid, in the vibrating or shaking action to which the fork is subjected in use, accidental registration of the roller 116 with the recess 117 which would result in the premature dropping of the load, the parts are so constructed and arranged that the plane formed by pivots 112 and 116 is adjusted by the nut 122 substantially above the upper edge of the recess 117.

The surfaces of the swivel 96 and jaws 105 and 106 which mutually engage in the locked condition of the swivel, are preferably beveled as described above of the other constructions shown, but the shaking or vibrating action to which the fork is subjected in use may be availed of as a factor in the designing of the angularity of these surfaces, as stated above in connection with the construction shown in Fig. 6.

While I have illustrated and described certain particular constructions embodying my invention I do not wish to be understood as intending to limit it thereto as the same may be variously modified and altered and the invention embodied in other forms of structure without departing from the spirit of my invention.

What I claim as new, and desire to secure by Letters Patent, is:

1. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member, a third member movable on said head, cooperating jaws for interlockingly engaging with said first-named member, one of said jaws being on said third member, means whereby said third member becomes disengaged from said first-named member when said rock member is rocked in one direction, the point of engagement of said fourth-named means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuable element operative when drawn on to said rock member in a direction to release said first-named member.

2. A grapple fork comprising tines, a head, means connecting said tines to said head, a movable member, means connecting said tines inwardly of their points of connection with said first-named means, to said member, releasable locking means for holding said member to said head and an actuable element engaging said member and controlling said locking means, said releasable locking means comprising a rock member, a third member movable on said head, cooperating jaws for interlockingly engaging with said first-named member, one of said jaws being on said third member, said third member in its interlocked relation with said first-named member tending to move out of locking position, controlling means for said third member operative when said rock member is rocked in one direction to permit said third member to move out of locking position, the point of engagement of said controlling means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element operative when drawn on to rock said rock member in a direction to release said first-named member.

3. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member, a third member pivoted on said head, cooperating jaws for interlockingly engaging with said first-named member, one of said jaws being on said third member, means whereby said third member becomes disengaged from said first-named member when said rock member is rocked in one direction, the point of engagement of said fourth-named means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element operative when drawn on to rock said rock member in a direction to release said first-named member.

4. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member, a depending link pivoted on said head, cooperating jaws for interlockingly engaging said first-named member, one of said jaws being on said link, means whereby said third member becomes disengaged from said first-named member when said rock member is rocked in one direction, the point of engagement of said fourth-named means with said link and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element operative when drawn on, to rock said rock member in a direction to release said first-named member.

5. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member, a third member pivoted on said head, cooperating jaws for interlockingly engaging with said first-named member, one of said jaws being on said third member, means whereby said third member becomes disengaged from said first-named member when said rock member is rocked in one direction, said fourth-named means comprising a link pivoted to said rock member and to said third member, the pivots of said rock member and said link and the pivoted connection between said link and said third member being disposed substantially in line when said jaws are interlocked with said first-named member, and means yieldingly resisting rocking movement of said rock member out of a position in which said jaws are interlocked with said first-named member, said actuatable element operative, when drawn on, to rock said member in a direction to release said first-named member.

6. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member, a third member pivoted on said head, cooperating jaws for interlockingly engaging with said first-named member, one of said jaws being on said third member, controlling means for said third member operative when said rock member is rocked in one direction to permit said third member to rock out of locking position, said controlling means comprising a stop on said rock member adapted to engage a side of said third member for holding it in locked position, said third member having a surface which, when in registration with said stop, permits said third member to move to released position, the point of engagement of said stop with said third member and the pivot of said rock member when said jaws are interlocked with said first-named member, being in a plane substantially at a right angle to the line of movement of said first-named member and said stop engaging said third member beyond said surface, and means yieldingly resisting rocking movement of said rock member out of a position in which said jaws are interlocked with said first-named member, said actuatable element operative when drawn on to rock said rock member in a direction to register said stop with said surface for releasing said first-named member.

7. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted to one side of said first-named member and disposed transversely of the line of movement of said first-named member and beyond the opposite side of said first-named member, a third member movable on said head, cooperating jaws for interlockingly engaging with said first-named member, one of said jaws being on said third member, means located adjacent the end of said rock member remote from its pivot whereby said third member becomes disengaged from said first-named member when said rock member is rocked in one direction, the point of engagement of said fourth-named means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element operative when drawn on to rock said rock member in a direction to release said first-named member.

8. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted to one side of said first-named member and disposed transversely of the line of movement of said first-named member and beyond the opposite side of said first-named member, a third member movable on said head, cooperating jaws for interlockingly engaging with said first-named member, one of said jaws being on said third member, said third member in its interlocked relation with said first-named member tending to move out of locking position, controlling means for said third member located adjacent the end of said rock member remote from its pivot and operative when said rock member is rocked in one direction to permit said third member to move out of locking position, the point of engagement of said controlling means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element operative when drawn on to rock said rock member in a direction to release said first-named member.

9. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted to one side of said first-named member and disposed transversely of the line of movement of said first-named member and beyond the opposite side of said first-named member, a third member pivoted on said head, cooperating jaws for interlocking engaging with said first-named member, one of said jaws being on said third member, means located adjacent the end of said rock member remote from its pivot whereby said third member becomes disengaged from said first-named member when said rock member is rocked in one direction, the point of engagement of said controlling means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element operative when drawn on to rock said rock member in a direction to release said first-named member.

10. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member, a third member movable on said head, cooperating jaws for interlockingly engaging with said first-named member, one of said jaws being on said third member, means whereby said third member becomes disengaged from said first-named member when said rock member is rocked in one direction, the point of engagement of said fourth-named means with said third member and the pivot of said rock member, when said jaws are interlocked with said first-named member, being in a plane substantially at a right angle to the line of movement of said first-named member, means yieldingly resisting rocking movement of said rock member out of a position in which said jaws are interlocked with said first-named member, said trip element engaging said rock member and operative when drawn on to rock said rock member in a direction to release said first-named member, and means for adjusting said fifth-named means to compensate for variations in the degree of force exerted against said rock member by said trip element resulting from variations in weight of said trip element imposed on said rock member.

11. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member, a third member movable on said head, cooperating jaws for interlockingly engaging with said first-named member, one of said jaws being on said third member, said third member in its interlocked relation with said first-named member tending to move out of locking position, controlling means for said third member operative when said rock member is rocked in one direction to permit said third member to move out of locking position, the point of engagement of said controlling means with said third member and the pivot of said rock member, when said jaws are interlocked with said first-named member, being in a plane substantially at a right angle to the line of movement of said first-named member, means yieldingly resisting rocking movement of said rock member out of a position in which said jaws are interlocked with said first-named member, said trip element engaging said rock member and operative when drawn on to rock said rock member in a direction to release said first-named member, and means for adjusting said fifth-named means to compensate for variations in the degree of force exerted against said rock member by said trip element resulting from variations in weight of said trip element imposed on said rock member.

12. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member, a third member pivoted on said head, cooperating jaws for interlockingly engaging with said first-named member, one of said jaws being on said third member, means whereby said third member becomes disengaged from said first-named member when said rock member is rocked in one direction, said fourth-named means comprising a link pivoted to said rock member and to said third member, the pivots of said rock member and said link and the pivoted connection between said link and said third member being disposed substantially in line when said jaws are interlocked with said first-named member, means yieldingly resisting rocking movement of said rock member out of a position in which said jaws are interlocked with said first-named member, said trip element engaging said rock member and operative, when drawn on, to rock said member in a direction to release said first-named member, and means for adjusting said fifth-named means to compensate for variations in the degree of force exerted against said rock member by said trip element resulting from variations in weight of said trip element imposed on said rock member.

13. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member, a third member pivoted on said head, cooperating jaws for interlockingly engaging with said first-named member, one of said jaws being on said third member, controlling means for said third member operative when said rock member is rocked in one direction to permit said third member to rock out of locking position, said controlling means comprising a stop on said rock member adapted to engage a side of said third member for holding it in locked position, said third member having a surface which, when in registration with said stop, permits said third member to move to released position, the point of engagement of said stop with said third member and the pivot of said rock member when said jaws are interlocked with said first-named member, being in a plane substantially at a right angle to the line of movement of said first-named member and said stop engaging said third member beyond said surface, means yieldingly resisting rocking movement of said rock member out of a position in which said jaws are interlocked with said first-named member, said trip element engaging said rock member and operative when drawn on to rock said rock member in a direction to register said stop with said surface for releasing said first-named member, and means for adjusting said fifth-named means to compensate for variations in the degree of force exerted against said rock member by said trip element resulting from variations in weight of said trip element imposed on said rock member.

14. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member pivoted to one side of said first-named member and disposed transversely of the line of movement of said first-named member and beyond the opposite side of said first-named member, a third member movable on said head, cooperating jaws for interlockingly engaging with said first-named member, one of said jaws being on said third member, means located adjacent the end of said rock member remote from its pivot whereby said third member becomes disengaged from said first-named member when said rock member is rocked in one direction, the point of engagement of said fourth-named means with said third member and the pivot of said rock member, when said jaws are interlocked with said first-named member, being in a plane substantially at a right angle to the line of movement of said first-named member, means yieldingly resisting rocking movement of said rock member out of a position in which said jaws are interlocked with said first- named member, said trip element engaging said rock member and operative when drawn on to rock said rock member in a direction to release said first-named member, and means for adjusting said fifth-named means to compensate for variations in the degree of force exerted against said rock member by said trip element resulting from variations in weight of said trip element imposed on said rock member.

15. A grapple fork comprising tines, a head, means connecting said tines to said head, a movable member, means connecting said tines inwardly at their points of connection with said first-named means, to said member, releasable locking means for holding said member to said head and an actuatable element engaging said member and controlling said locking means, said releasable locking means comprising a rock member pivoted directly to said head, a third member movable on said head, cooperating jaws for interlockingly engaging with said first-named member, one of said jaws being on said head and the other on said third member, means whereby said third member becomes disengaged from said first-named member when said rock member is rocked in one direction, the point of engagement of said fourth-named means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element engaging said rock member and operative when drawn on to rock said rock member in a direction to release said first-named member.

16. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted directly to said head, a third member movable on said head, cooperating jaws for interlockingly engaging with said first-named member, one of said jaws being on said head and the other on said third member, said third member in its interlocked relation with said first-named member tending to move out of locking position, controlling means for said third member operative when said rock member is rocked in one direction to permit said third member to move out of locking position, the point of engagement of said controlling means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element engaging said rock member and operative when drawn on to rock said rock member in a direction to release said first-named member.

17. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted directly to said head, a third member pivoted on said head, cooperating jaws for interlockingly engaging with said first-named member, one of said jaws being on said head and the other on said third member, means whereby said third member becomes disengaged from said first-named member when said rock member is rocked in one direction, said fourth-named means comprising a link pivoted to said rock member and to said third member, the pivots of said rock member and said link and the pivoted connection between said link and said third member being disposed substantially in line when said jaws are interlocked with said first-named member, and means yieldingly resisting rocking movement of said rock member out of a position in which said jaws are interlocked with said first-named member, said actuatable element engaging said rock member and operative, when drawn on, to rock said rock member in a direction to release said first-named member.

18. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted directly to said head, a third member pivoted on said head, cooperating jaws for interlockingly engaging with said first-named member, one of said jaws being on said head and the other on said third member, controlling means for said third member operative when said rock member is rocked in one direction to permit said third member to rock out of locking position, said controlling means comprising a stop on said rock member adapted to engage a side of said third member for holding it in locked position, said third member having a surface which, when in registration with said stop, permits said third member to move to released position, the point of engagement of said stop with said third member and the pivot of said rock member when said jaws are interlocked with said first-named member, being in a plane substantially at a right angle to the line of movement of said first-named member and said stop engaging said third member beyond said surface, and means yieldingly resisting rocking movement of said rock member out of a position in which said jaws are interlocked with said first-named member, said actuatable element engaging said rock member and operative when drawn on to rock said rock member in a direction to register said stop with said surface for releasing said first-named member.

19. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted directly to said head to one side of said first-named member and disposed transversely of the line of movement of said first-named member and beyond the opposite side of said first-named member, a third member movable on said head, cooperating jaws for interlockingly engaging with said first-named member, one of said jaws being on said head and the other on said third member, means located adjacent the end of said rock member remote from its pivot whereby said third member becomes disengaged from said first-named member when said rock member is rocked in one direction, the point of engagement of said four-named means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element engaging said rock member and operative when drawn on to rock said rock member in a direction to release said first-named member.

20. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted directly to said head to one side of said first-named member and disposed transversely of the line of movement of said first-named member and beyond the opposite side of said first-named member, a third member movable on said head, cooperating jaws for interlockingly engaging with said first-named member, one of said jaws being on said head and the other on said third member, said third member in its interlocked relation with said first-named member tending to move out of locking position, controlling means for said third member located adjacent the end of said rock member remote from its pivot and operative when said rock member is rocked in one direction to permit said third member to move out of locking position, the point of engagement of said controlling means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element engaging said rock member and operative when drawn on to rock said rock member in a direction to release said first-named member.

21. A grapple fork comprising tines, a head, means connecting said tines to said head, a movable member, means connecting said tines inwardly of their points of connection with said first-named means, to said member, releasable locking means for holding said member to said head and an actuatable element engaging said member and controlling said locking means, said releasable locking means comprising a rock member pivoted directly to said head to one side of said first-named member and disposed transversely of the line of movement of said first-named member and beyond the opposite side of said first-named member, a third member pivoted on said head, cooperating jaws for interlockingly engaging with said first-named member, one of said jaws being on said head and the other on said third member, means located adjacent the end of said rock member remote from its pivot whereby said third member becomes disengaged from said first-named member when said rock member is rocked in one direction, the point of engagement of said controlling means with said third member and the pivot of said rock member, when said jaws are interlocked with said first-named member, being in a plane substantially at a right angle to the line of movement of said first-named member, and means yieldingly resisting rocking movement of said rock member out of a position in which said jaws are interlocked with said first-named member, said actuatable element engaging said rock member and operative when drawn on to rock said rock member in a direction to release said first-named member.

22. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member pivoted directly to said head, a third member movable on said head, cooperating jaws for interlockingly engaging with said first-named member, one of said jaws being on said head and the other on said third member, means whereby said third member becomes disengaged from said first-named member when said rock member is rocked in one direction, the point of engagement of said fourth-named means with said third member and the pivot of said rock member, when said jaws are interlocked with said first-named member, being in a plane substantially at a right angle to the line of movement of said first-named member, means yieldingly resisting rocking movement of said rock member out of a position in which said jaws are interlocked with said first-named member, said trip element engaging said rock member and operative when drawn on to rock said rock member in a direction to release said first-named member, and means for adjusting said fifth-named means to compensate for variations in the degree of force exerted against said rock member by said trip element resulting from variations in weight of said trip element imposed on said rock member.

23. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member pivoted directly to said head, a third member movable on said head, cooperating jaws for interlockingly engaging with said first-named member, one of said jaws being on said head and the other on said third member, said third member in its interlocked relation with said first-named member tending to move out of locking position, controlling means for said third member operative when said rock member is rocked in one direction to permit said third member to move out of locking position, the point of engagement of said controlling means with said third member and the pivot of said rock member, when said jaws are interlocked with said first-named member, being in a plane substantially at a right angle to the line of movement of said first-named member, means yieldingly resisting rocking movement of said rock member out of a position in which said jaws are interlocked with said first-named member, said trip element engaging said rock member and operative when drawn on to rock said rock member in a direction to release said first-named member, and means for adjusting said fifth-named means to compensate for variations in the degree of force exerted against said rock member by said trip element resulting from variations in weight of said trip element imposed on said rock member.

24. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member pivoted directly to said head, a third member pivoted on said head, cooperating jaws for interlockingly engaging with said first-named member, one of said jaws being on said head and the other on said third member, means whereby said third member becomes disengaged from said first-named member when said rock member is rocked in one direction, said fourth-named means comprising a link pivoted to said rock member and to said third member, the pivots of said rock member and said link and the pivoted connection between said link and said third member being disposed substantially in line when said jaws are interlocked with said first-named member, means yieldingly resisting rocking movement of said rock member out of a position in which said jaws are interlocked with said first-named member, said trip element engaging said rock member and operative, when drawn on, to rock said rock member in a direction to release said first-named member, and means for adjusting said fifth-named means to compensate for variations in the degree of force exerted against said rock member by said trip element resulting from variations in weight of said trip element imposed on said rock member.

25. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member pivoted directly to said head, a third member pivoted on said head, cooperating jaws for interlockingly engaging with said first-named member, one of said jaws being on said head and the other on said third member, controlling means for said third member operative when said rock member is rocked in one direction to permit said third member to rock out of locking position, said controlling means comprising a stop on said rock member adapted to engage a side of said third member for holding it in locked position, said third member having a surface which, when in registration with said stop, permits said third member to move to released position, the point of engagement of said stop with said third member and the pivot of said rock member when said jaws are interlocked with said first-named member, being in a plane substantially at a right angle to the line of movement of said first-named member and said stop engaging said third member beyond said surface, means yieldingly resisting rocking movement of said rock member out of a position in which said jaws are interlocked with said first-named member, said trip element engaging said rock member and operative when drawn on to rock said rock member in a direction to register said stop with said surface for releasing said first-named member, and means for adjusting said fifth-named means to compensate for variations in the degree of force exerted against said rock member by said trip element resulting from variations in weight of said trip element imposed on said rock member.

26. A grapple fork comprising tines, a head, means connecting said tines to said head, a movable member, means connecting said tines inwardly of their points of connection with said first-named means, to said member, releasable locking means for holding said member to said head and a depending trip element engaging said member and controlling said locking means, said releasable locking means comprising a rock member pivoted directly to said head to one side of said first-named member and disposed transversely of the line of movement of said first-named member and beyond the opposite side of said first-named member, a third member movable on said head, cooperating jaws for interlockingly engaging with said first-named member, one of said jaws being on said head and the other on said third member, means located adjacent the end of said rock member remote from its pivot whereby said third member becomes disengaged from said first-named member when said rock member is rocked in one direction, the point of engagement of said fourth-named means with said third member and the pivot of said rock member, when said jaws are interlocked with said first-named member, being in a plane substantially at a right angle to the line of movement of said first-named member, means yieldingly resisting rocking movement of said rock member out of a position in which said jaws are interlocked with said first-named member, said trip element engaging said rock member and operative when drawn on to rock said rock member in a direction to release said first-named member, and means for adjusting said fifth-named means to compensate for variations in the degree of force exerted against said rock member by said trip element resulting from variations in weight of said trip element imposed on said rock member.

27. A grapple fork comprising tines, a head, means connecting said tines to said head, a movable member, mean connecting said tines inwardly of their points of connection with said first-named means, to said member, releasable locking means for holding said member to said head and an actuatable element engaging said member and controlling said locking means, said releasable locking means comprising cooperating jaws for interlockingly engaging said member and toggle mechanism, at least one of said jaws being connected with said toggle mechanism, said mechanism operative when in extended position to hold said member in locked position and said member being released in the movement of said toggle mechanism toward collapsed condition.

HOWARD J. FERRIS.